Figure 1:
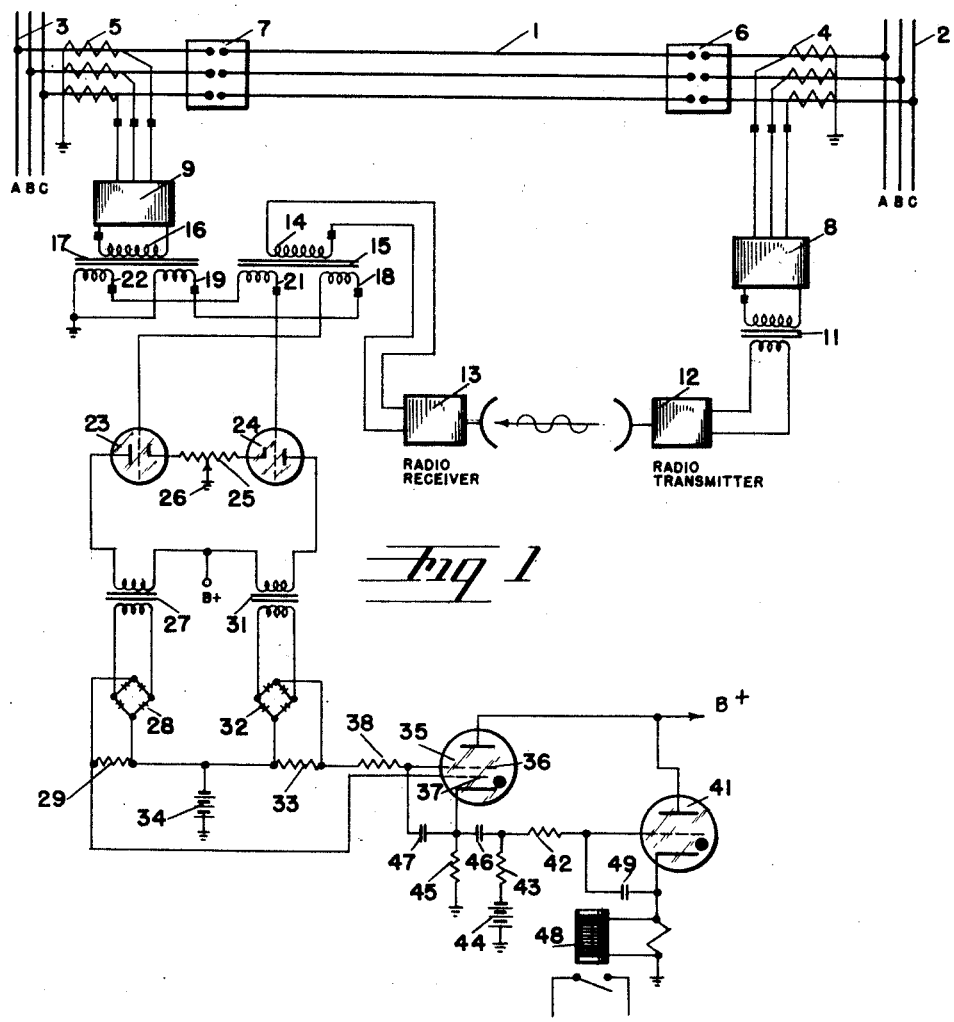

June 24, 1952  D. L. WYLIE  2,601,354
ELECTRONIC DIFFERENTIAL RELAY SYSTEM
Filed June 9, 1950

INVENTOR.
DONALD L. WYLIE
BY
ATTORNEY

Patented June 24, 1952

2,601,354

UNITED STATES PATENT OFFICE 2,601,354

ELECTRONIC DIFFERENTIAL RELAY SYSTEM

Donald L. Wylie, Portland, Oreg.

Application June 9, 1950, Serial No. 167,240

2 Claims. (Cl. 175—294)

(Granted under the act of March 3, 1883, as amended April 30, 1928; 370 O. G. 757)

1

The invention described herein may be manufactured and used by or for the Government of the United States for governmental purposes without the payment of any royalty thereon in accordance with the provisions of the act of March 3, 1883 (22 Stat. 625), as amended by the act of April 30, 1928 (45 Stat. 467, 35 U. S. C., 1946 ed. sec. 45).

This invention relates to the protection of high voltage power transmission lines. It is concerned particularly with protective relay arrangements of the kind in which conditions at the two ends of a line are compared to determine the existence of a fault in the line. This invention can be regarded in some respects as a variety of pilot wire relay system with the unusual feature of using a radio transmission system instead of a conventional pilot wire. Systems of this kind have, in the prior art, depended largely on electro-mechanical devices which have characteristics that can be related in a statistical way to the characteristics of power transmission lines under fault conditions. There are relaying systems in the prior art which use electronic vacuum tubes instead of some of the electromechanical arrangements. My present invention also uses vacuum tubes, but in a novel way.

Pilot wire and other relay systems of the prior art use, among other devices, phase sequence networks which are capable of converting a polyphase input into a single-phase output of magnitude and phase indicative of the departure from normally balanced polyphase operation. Networks of this kind are used in my present invention.

The principal object of my present invention is to provide a fast and accurate protective relay system comparing current conditions at the ends of a line, and communicating between the ends of the line through a pilot connection channel. Another object is the production of a relay system which is faster and more accurate than conventional relay systems. Other objects are: to provide a system in which relay operation is definitely restrained and operated correctly in reference to line conditions; to provide in a relay system an arrangement of phased current circuits in which currents and voltages are compared with reference to apparatus characteristics representative of the characteristics of power transmission lines; to provide ways of using available electronic vacuum tube characteristics as means for automatically discriminating between real and apparent fault conditions; and to provide vacuum tube arrangements for fault discrimination in which the

2 configuration of the tube characteristics can be adjusted to fit the fault conditions of the line concerned.

What constitutes my present invention is set forth, with reference to the accompanying drawing, in the following specification and succinctly defined in the appended claims.

Figure 2:
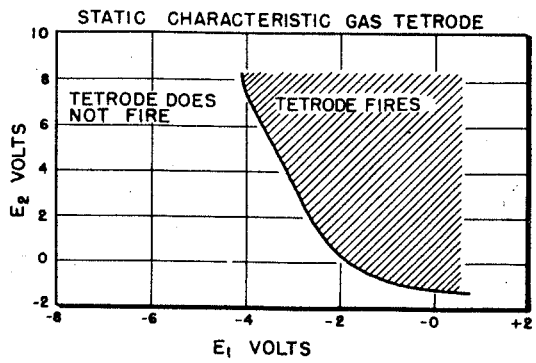

In the drawing, Figure 1 is a circuit diagram of a preferred form of embodiment of my invention, and Figure 2 is a graphical representation of the performance of my invention under specified conditions.

In Figure 1, a conventional polyphase electric power transmission line 1 terminating at substation busses 2 and 3 is equipped with conventional sets of current transformers 4 and 5. The usual circuit breakers, 6 and 7, are provided. Current transformer sets 4 and 5 are connected, respectively, to phase sequence networks 8 and 9 in ways known in the prior art. This invention compares the two single-phase output currents of networks 8 and 9 in novel ways to be described.

The output of network 8 is delivered through a transformer 11 to a radio transmitter 12 which sends a signal to a radio receiver 13. Receiver 13 delivers to input coil 14 of a transformer 15 a signal in phase with the output of network 8. The communicating channel, in this instance consisting of a radio transmitter and receiver could, under suitable conditions, consist of solid conductor, transmission line carrier current, or any other applicable interconnection. The output of network 9 is delivered in a way analagous to that of network 8 to a coil 16 of a transformer 17. Transformers 15 and 17 are interconnected by output coils 18 and 19 and by coils 21 and 22. The resultant voltage of coils 18 and 19 is impressed on the grid of a thermionic triode 23. Similarly the resultant voltage of coils 21 and 22 is impressed on the grid of a triode 24.

Under normal conditions of line operation, the currents in a particular conductor of line 1 are in phase. The corresponding voltages in transformer coils 18 and 19 are phased to be additive. The voltages in coils 21 and 22 are phased to be subtractive. If a fault occurs outside line 1, the current therein will usually increase. This will cause the resultant voltage of coils 18 and 19 to increase. The resultant voltage of coils 21 and 22 is normally a small value. When a fault occurs outside line 1, any increase in current in the line, being the same at both ends, still leaves the resultant voltage at a small value. The resultant voltages of coils 18 and 19 and coils 21 and 22 depend upon both relative magnitudes and phase, but under normal conditions the resultant voltage of coils 18 and 19 is comparatively large and the resultant voltage of coils 21 and 22 practically zero. This latter voltage remains practically zero for faults outside the protected line 1.

When a fault occurs in line 1, some current flows to the fault from both ends, thus producing components of current 180 electrical degrees out of phase between the two ends of the line. These out-of-phase components, when they appear in coils 18 and 19, add to the voltage of one coil and subtract from the other. The resultant voltage of the two coils is thereby decreased in comparison with that voltage which would exist without the presence of out-of-phase components. The out-of-phase components, when they appear in coils 21 and 22 increase the resultant voltage from the normal resultant of practically zero. These conditions presuppose proportionality between the output of phase sequence network 8 and the output of radio receiver 13.

The combination of networks 8 and 9, and coils 21 and 22, in the normal condition of practically zero resultant voltage together with the departure under fault conditions of the resultant voltage from zero provides a reliable method of fault detection by comparing conditions at the two ends of line 1. The additional combination of coils 18 and 19 in which the resultant voltage decreases under fault conditions contributes additionally to reliability through differential effect between the two triodes 23 and 24. There are some fault conditions in which extreme unbalance of current magnitude at the two ends of the line will cause an increase in the resultant voltage of coils 18 and 19 instead of a decrease as can be expected under ordinary fault conditions. It is desirable therefore to provide an adjustment of ratio between the outputs of triodes 23 and 24 to establish an optimum relationship between their relative effects. A potentiometer 25 connected between the cathodes of triodes 23 and 24 is grounded at a tap 26. Adjustment of the tap 26 changes the ratio of the cathode-to-ground resistances for the two triodes. Shifting the tap 26 toward triode 23 decreases the grid bias voltage on triode 23 relative to that of triode 24.

The output of triode 23 is delivered to a transformer 27 which delivers to a full wave rectifier 28 the alternating component of the plate output of triode 23. Rectifier 28 produces a rectified full-wave voltage in resistor 29. Similarly the output of triode 24 is delivered to a transformer 31 which, through a rectifier 32 produces a rectified full-wave voltage across a resistor 33.

Resistors 29 and 33 are connected as shown through a bias battery 34 polarized to oppose the voltage in resistor 33 and to augment the voltage in resistor 29. The resultant voltages of resistors 33 and 29 are used to control a gas-filled tetrode 35. Tetrode 35 contains the unusual plate and cathode and two grids 36 and 37. Grid 36 is subjected to the positive voltage of resistor 33 through a stabilizing resistor 38. An increase of voltage on grid 36 tends to ionize and to fire tube 35. Grid 37 is subjected to the negative voltage of resistor 29, an increase in which tends to restrain tube 35 from firing. The relative and absolute magnitude of the potentials on grids 36 and 37 both influence the firing of tetrode 35.

Tetrode 35 controls a thyratron or other conventional relay circuit which in turn controls circuit breaker 7. As an illustration of a practical arrangement, a thyratron 41 with conventional grid bias resistors 42 and 43 and a bias battery 44 is controlled by the output of tetrode 35 which is impressed on a plate resistor 45 with which the usual condensers 46 and 47 are provided. The output of thyratron 41 is used to operate a relay 48 which may equally well be the trip coil of a circuit breaker. Relay 48 or trip coil 48, as the case may be, opens circuit breaker 7 by methods which are conventional in the art. The combination of thyratron 41 and the associated elements 42 to 48, inclusive, is referred to, for convenience, as a "tripping circuit."

The usual plate power, B+, by-pass condenser 49 and other conventional parts are provided as usual.

I have shown elements of this invention numbered from 1 to 26, inclusive, in a copending application, Serial Number 164,122, filed May 25, 1950, for patent on a similar subject matter and in a continuation thereof Ser. No. 175,847, filed July 25, 1950, both of which are now abandoned. In that application there were also polarized unidirectional voltages which were referred to as operating and restraining voltages. My present invention is related to the previous invention to that degree, but in the present invention the operating and restraining voltages act concurrently on the double grid structure of tetrode 35. The use of tetrode 35 in the way indicated graphically in Figure 2 is the principal feature of novelty in my present invention.

Figure 2 shows how a restraining voltage $E_1$ provided by resistor 29 and impressed on grid 37 co-acts with an operating voltage $E_2$ impressed on grid 36 by resistor 33 to fire tetrode 35 depending both on the magnitude of the respective voltages and on their ratios. For example, if the restraining voltage $E_1$ is —4 volts, the tetrode will not fire even if the operating voltage is as much as +6 volts, but if the restraining voltage is decreased to —2 volts, the tetrode will fire even when the operating voltage is as low as +1 volt.

The configuration of the operating characteristic of tetrode 35 is selected in accordance with the relationship of operating and restraining voltages characteristic of practical fault conditions on the line 1. It is desired that tetrode 35 be restrained from firing for those conditions in which the operating and restraining voltages both decrease to small values. In particular it is desarable that if, through apparatus failure, the voltages on resistors 29 and 33 decrease to zero, the tetrode will be effectively restrained. This is accomplished by battery 34 which holds both grids 36 and 37 negative in the absence of signals from rectifiers 28 and 32. The characteristics of phase sequence networks 8 and 9 are such that for faults outside line 1 the voltages $E_1$ and $E_2$ will lie to the left of the cross-hatched region in Figure 2, and for faults inside line 1, in the hatched area.

The configuration of the firing area in Figure 2 is characteristic of one particular tetrode which is adaptable to a particular transmission line characteristic. Under other conditions the most desirable tetrode characteristic might be different from that illustrated in Figure 2. This can be accomplished by the selection of existing tetrodes or if necessary the design of tetrodes with the desired characteristics. The relationship of the hatched to the open area in Fig. 2 and the configuration of the boundary between the two areas is referred to for convenience as the "tripping characteristic" of the relay system in which tetrode 35 is used. This follows from the fact that circuit breaker 7 is tripped and opened when tetrode 35 fires.

I claim:

1. In a protective relay system for a polyphase electric power transmission line, the combination with means for deriving at each end of said transmission line a single phase current responsive to phase conditions at said end, of means for deriving voltages respectively proportional to the sum of and to the difference between said single phase currents, triodes respectively controlled by said sum derived and difference derived voltages, means for adjusting the ratio between the outputs of said triodes, a tetrode, means for segregating and rectifying the output of the triode controlled by the sum derived voltage and for applying said rectified component to negatively bias one grid of and hence restrain firing of the tetrode, means for segregating and rectifying the output of the triode controlled by the difference derived voltage and for applying the so rectified component to positively bias another grid of and hence promote firing of the tetrode, and relay means controlled by said tetrode.

2. A combination according to claim 1, further comprising means for applying a negative fixed bias to both grids to the tetrode sufficient to prevent firing of the tetrode when the rectified component biases are both of low value.

DONALD L. WYLIE.

REFERENCES CITED

The following references are of record in the file of this patent:

UNITED STATES PATENTS

| Number | Name | Date |
|---|---|---|
| 1,787,181 | Traver | Dec. 30, 1930 |
| 2,027,214 | Wideroe | Jan. 7, 1936 |
| 2,047,343 | Ward | July 14, 1936 |
| 2,147,781 | Ward | Feb. 21, 1939 |
| 2,508,198 | Sonnemann | May 16, 1950 |
| 2,511,680 | Warrington | June 13, 1950 |
| 2,529,723 | Chevallier | Nov. 14, 1950 |